US008640561B2

(12) United States Patent
Harie et al.

(10) Patent No.: US 8,640,561 B2
(45) Date of Patent: Feb. 4, 2014

(54) MOVABLE BODY DRIVING APPARATUS (75) Inventors: Hiroshi Harie, Suzuka (JP); Atsushi Kitabata, Suzuka (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 12/418,631

(22) Filed: Apr. 6, 2009

(65) Prior Publication Data

US 2009/0266185 A1  Oct. 29, 2009

(30) Foreign Application Priority Data

Apr. 25, 2008  (JP) .................................. 2008-115220

(51) Int. Cl.
*F16H 27/02*  (2006.01)
*H02K 7/116*  (2006.01)

(52) U.S. Cl.
USPC .............................. 74/89; 74/89.12; 74/421 A (58) Field of Classification Search
USPC ......... 74/89, 89.11, 89.12, 421 A; 403/359.1, 403/359.2, 359.3
See application file for complete search history.

(56) References Cited

U.S. PATENT DOCUMENTS

| 72,409 | A | * | 12/1867 | Mason | 403/359.1 |
|---|---|---|---|---|---|
| 2,320,379 | A | * | 6/1943 | Niekamp | 74/421 A |
| 2,503,027 | A | * | 4/1950 | Christian | 74/421 A |
| 2,566,571 | A | * | 9/1951 | Leland | 74/89 |
| 2,887,889 | A | * | 5/1959 | Parisoe et al. | 74/99 A |
| 2,966,064 | A | * | 12/1960 | Courtney | 74/89 |
| 3,287,031 | A | * | 11/1966 | Simmons et al. | 285/27 |
| 3,307,056 | A | * | 2/1967 | Wootley | 310/41 |
| RE27,126 | E | * | 5/1971 | Gingery | 192/70.13 |
| 3,743,987 | A | * | 7/1973 | Yost | 335/228 |
| 4,134,713 | A | * | 1/1979 | Binaut | 418/91 |
| 4,685,823 | A | * | 8/1987 | Lopez | 403/359.2 |
| 5,261,289 | A | * | 11/1993 | Birch et al. | 74/421 A |
| 5,934,143 | A | * | 8/1999 | Dibbern et al. | 74/421 A |
| 7,387,462 | B2 | * | 6/2008 | Hacker | 403/359.6 |
| 2006/0169082 | A1 | * | 8/2006 | Clark, Jr. | 74/425 |
| 2006/0238060 | A1 | | 10/2006 | Sesita et al. | |
| 2007/0251150 | A1 | * | 11/2007 | Harie | 49/358 |

FOREIGN PATENT DOCUMENTS

| JP | 45-12628 B | | 5/1970 |
|---|---|---|---|
| JP | 2003-356070 A | | 12/2000 |
| JP | 2005-110449 A | | 4/2005 |
| JP | 2006-311658 A | | 11/2006 |
| JP | 2007-297796 A | | 11/2007 |
| JP | 2009264006 A | * | 11/2009 |

OTHER PUBLICATIONS

JP Office Action issued Jul. 17, 2012 for corresponding JP2008-115220.

* cited by examiner

*Primary Examiner* — Marcus Charles
*Assistant Examiner* — Adam D Rogers
(74) *Attorney, Agent, or Firm* — Rossi, Kimms & McDowell LLP (57) ABSTRACT

A door driving apparatus having a motor, a sleeve formed at a drive end of a rotor of the motor, a pinion integrally fixed to a rotation shaft integrated with a spline shaft detachably fitted to the sleeve, and left and right racks disposed opposite to each other with respect to the pinion and engaged with the pinion so that the left and right racks can move in directions substantially parallel and opposite to each other. When the motor is individually removed from a rack and pinion casing, the pinion is left in the pinion and rack casing while upper and lower sides of the pinion are engaged with the right and left racks, respectively. Accordingly, the relative positions of the left and right racks are unchanged.

9 Claims, 7 Drawing Sheets

Prior Art

FIG. 8
Prior Art

MOVABLE BODY DRIVING APPARATUS

BACKGROUND

The present invention relates to a movable body driving apparatus. In particular, it relates to a movable body driving apparatus having a structure in which a motor can be individually removed easily, for example, in a state where a vehicle or the like is rigged with the apparatus in order to open and shut a door of the vehicle automatically.

It is commonly known to utilize a linear motor in a movable body driving apparatus that is used to open and shut a door of a vehicle or the like. When the movable body driving apparatus is a movable coil type linear motor driving apparatus, the sum of the length (generally 600 mm to 900 mm) of a door stroke and the length of a movable part is structurally equal to the length of a stationary part. Accordingly, because the mass of the apparatus increases and the area occupied by the apparatus increases compared with a rotation type driving apparatus, there is a problem that it takes a lot of time, effort and trouble to rig a vehicle with the apparatus. On the other hand, when the moveable body driving apparatus utilizes a permanent magnet type movable coil type linear motor, there is a problem in that the linear motor is expensive because of a large amount of rare-earth permanent magnet that must be used in the permanent magnet.

Therefore, due to the fact that a rotation type motor is adapted to a compact design, there has been proposed a movable body driving apparatus including a turning device made of a combination of a rack of a linear door driving apparatus and a pinion, and a permanent magnet synchronous motor as a flat motor attached to the pinion of the turning device (e.g. see JP-A-2007-297796 (paragraphs [0019] to [0022] and FIG. 3).

Figure 7:
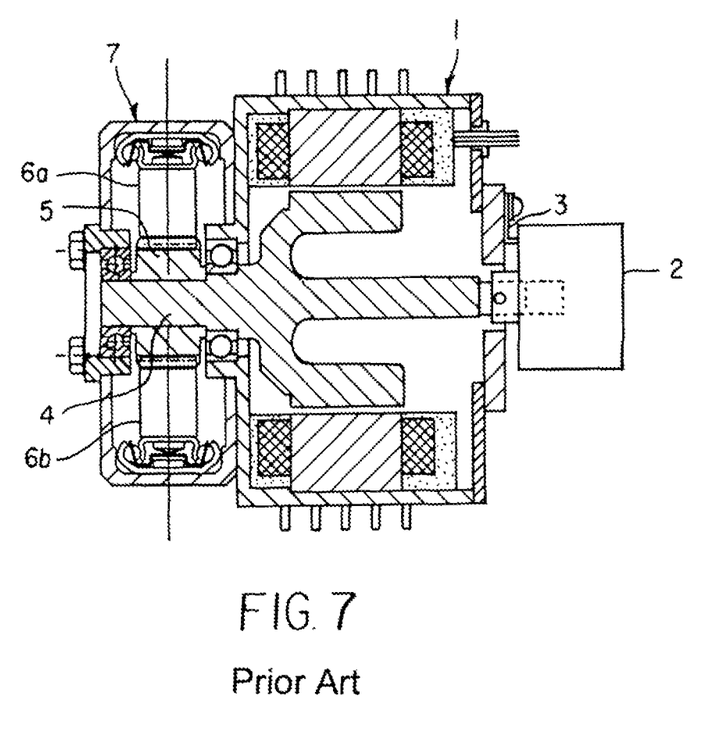
FIG. 7 is a view showing a permanent magnet synchronous motor formed so as to be close to a flat motor used in a movable body driving apparatus designed compactly according to the related art.

FIG. 7 is a view showing a permanent magnet synchronous motor formed so as to be close to a flat motor used in such a movable body driving apparatus designed compactly according to the related art. The motor 1 shown in FIG. 7 is a flat motor but the size of the motor is changed from that according to the related art. Moreover, an encoder 2 is externally provided and attached to an encoder attachment plate spring 3. A pinion 5 is fixed to a motor shaft 4, upper and lower racks 6a and 6b are engaged with the pinion 5, and a pinion and rack frame 7 supports the pinion 5 and the upper and lower racks 6a and 6b and other parts in the pinion and rack frame 7 as shown in FIG. 7 is the same as in the related art.

As described in the related art, when the motor 1 in FIG. 7 rotates in one of opposite directions, the pinion 5 fixed to the motor shaft 4 rotates in one of opposite directions to thereby move the upper and lower racks 6a and 6b in opposite lateral directions (opposite cross directions in FIG. 7) respectively. Though not shown, left and right doors are attached to the upper and lower racks 6a and 6b through an upper rack linker and a lower rack linker, respectively. When the upper and lower racks 6a and 6b move in opposite lateral directions respectively, the left and right doors are opened or closed.

Figure 8:
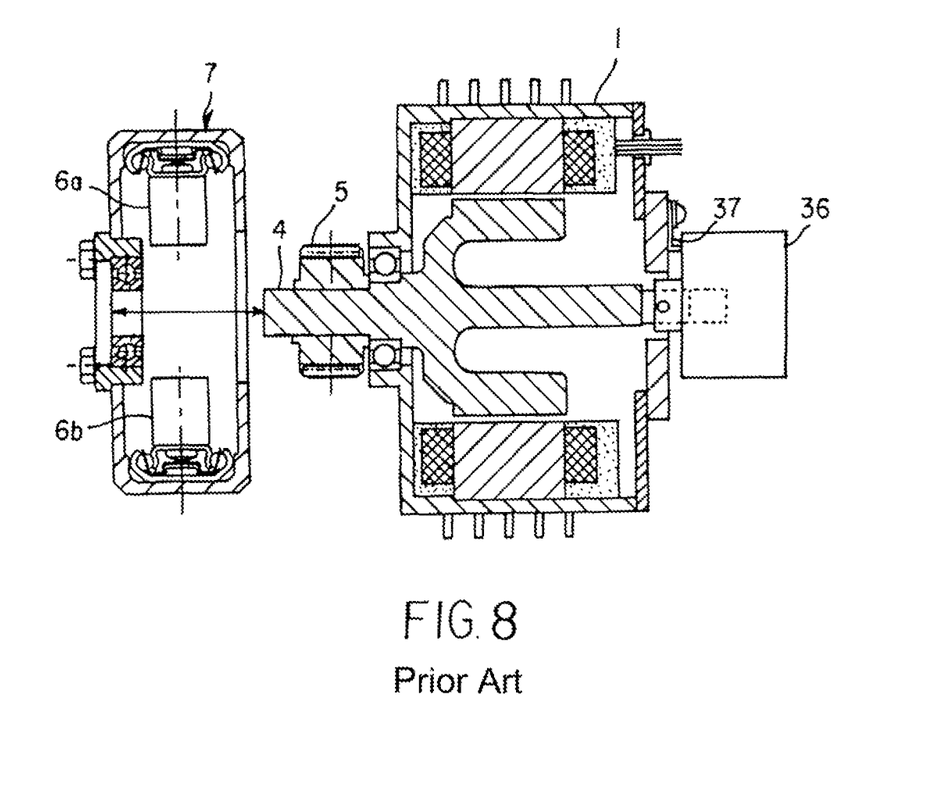
FIG. 8 is a view showing a state where the motor used in the movable body driving apparatus designed compactly according to the related art is detached from a pinion and rack frame.

FIG. 8 is a view showing a state where the motor 1 is detached from the pinion 5 and rack frame 7. When the motor 1 needs to be repaired, the motor 1 is detached from the pinion and rack frame 7 in this manner. However, because the pinion 5 engaged with the upper and lower racks 6a and 6b is fixed to the motor shaft 4, the motor 1 cannot be removed by itself, but instead, the pinion 5 is removed together with the motor 1.

If the pinion 5 is removed together with the motor shaft 4 from the pinion and rack frame 7 whenever the motor 1 is repaired as described above, displacement occurs every time in the relative positions of the upper and lower racks 6a and 6b disengaged from the pinion 5. If displacement occurs in the relative positions of the upper and lower racks 6a and 6b as described above, it is necessary to align the displaced positions of the upper and lower racks 6a and 6b and input information of the alignment to a controller which controls door opening/closing when the repaired motor 1 or a new motor 1 for exchange is attached to the pinion and rack frame 7.

The motor 1 may be overhauled relatively frequently for periodic inspection. If it is necessary to align the displaced positions of the upper and lower racks 6a and 6b and input the alignment information to the controller whenever the motor 1 undergoes periodic inspection, a lot of time, effort and trouble occurs each time the motor must be removed.

SUMMARY OF THE INVENTION

The present invention provides a movable body driving apparatus having a structure in which a motor can be individually removed easily in a state where a vehicle or the like is rigged with the apparatus as a whole. According to a first aspect of the invention, a movable body driving apparatus includes: a rotation actuator; a rotation transmission portion integrally formed at one end of an output shaft of the rotation actuator; a rotation transmitter releaseably fitted to the rotation transmission portion; and a pair of linear transmitters disposed opposite to each other with respect to the rotation transmitter and engaged with the rotation transmitter so that the pair of linear transmitters can move in directions substantially parallel and opposite to each other.

According to a second aspect of the invention, a movable body driving apparatus includes: a rotation actuator; a rotation transmission portion integrally formed at one end of an output shaft of the rotation actuator; a rotation transmitter releaseably fitted to the rotation transmission portion; and a linear transmitter engaged with the rotation transmitter so that the linear transmitter can move in both forward and backward directions substantially parallel to each other.

In the movable body driving apparatus according to the first or second aspect of the invention described above, the rotation actuator preferably has first and second shaft bearing members which bear opposite ends of the output shaft. Further, the movable body driving apparatus preferably includes guide members which guide the linear transmitters. Still further, the movable body driving apparatus preferably includes holding casings which hold the linear transmitters and the guide members, wherein the holding casings are fixed to a housing frame of the rotation actuator so that the holding casings can be attached/detached to/from the housing frame. In addition, the rotation actuator preferably has at least one sensor which can detect the number of rotations and the direction of rotation of the output shaft.

According to the invention, it is possible to provide a movable body driving apparatus having a structure in which a motor can be individually removed easily in a state where a vehicle or the like is rigged with the movable body driving apparatus.

Other features, advantages, embodiments and modifications of the invention will become apparent to those skilled in the art from the following detailed description of the preferred embodiments of the invention.

BRIEF DESCRIPTION OF THE DRAWINGS

The invention will be described with reference to certain preferred embodiments thereof and the accompanying drawings, wherein.

DESCRIPTION OF THE PREFERRED EMBODIMENTS

Figure 1:
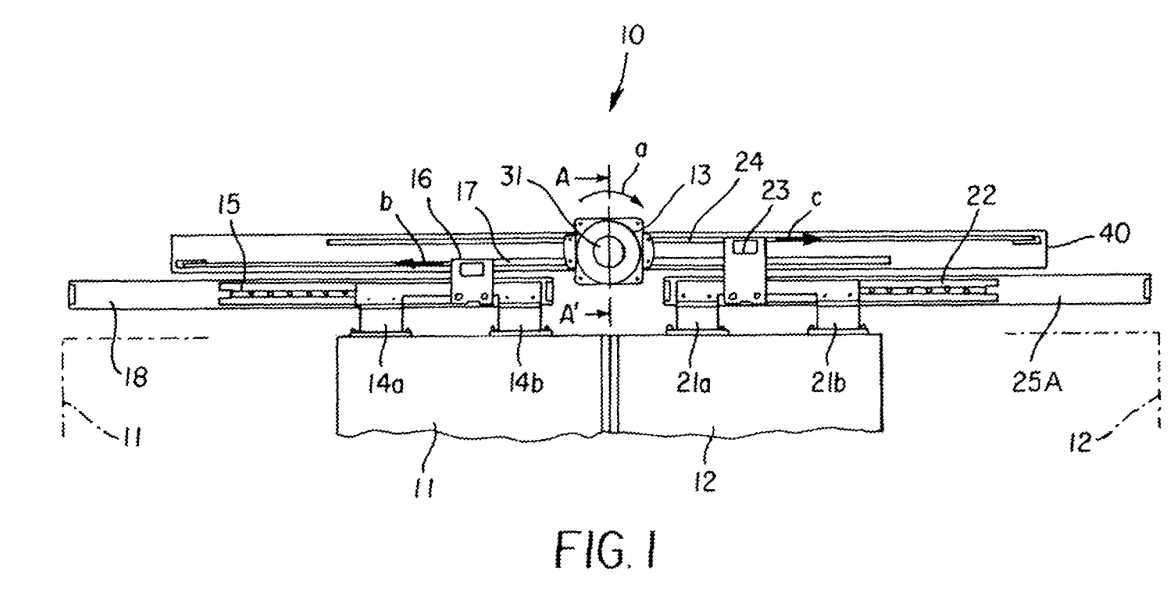
FIG. 1 is an overall front view showing the case where a movable body driving apparatus according to a first embodiment of the invention is applied to a door driving apparatus.

FIG. 1 is an overall front view showing the case where a movable body driving apparatus according to the invention is applied to a door driving apparatus. In FIG. 1, the door driving apparatus 10 as a movable body driving apparatus has a pinion and rack casing 40, and a motor 13 provided outside of the pinion and rack casing 40. The pinion and rack casing 40 includes two racks as linear transmitters connected to a pair of left and right doors 11 and 12 as movable bodies through connection members, and a pinion as a rotation transmitter. The motor 13 serves as a rotation actuator connected to the pinion.

As the connection members, there are hangers 14a and 14b for hanging the left door 11, a left slide rail 15 fixed to the hangers 14a and 14b, and a linker 16 fixed to the left slide rail 15. The left rack 17 is fixed and attached to the linker 16. The left slide rail 15 is formed so as to be able to slide along a left door rail 18.

Similarly, as the connection members, there are hangers 21a and 21b for hanging the right door 12, a right slide rail 22 fixed to the hangers 21a and 21b, and a linker 23 fixed to the right slide rail 22. The right rack 24 is fixed and attached to the linker 23. The right slide rail 22 is formed so as to be able to slide along a right door rail 25A.

Figure 2:
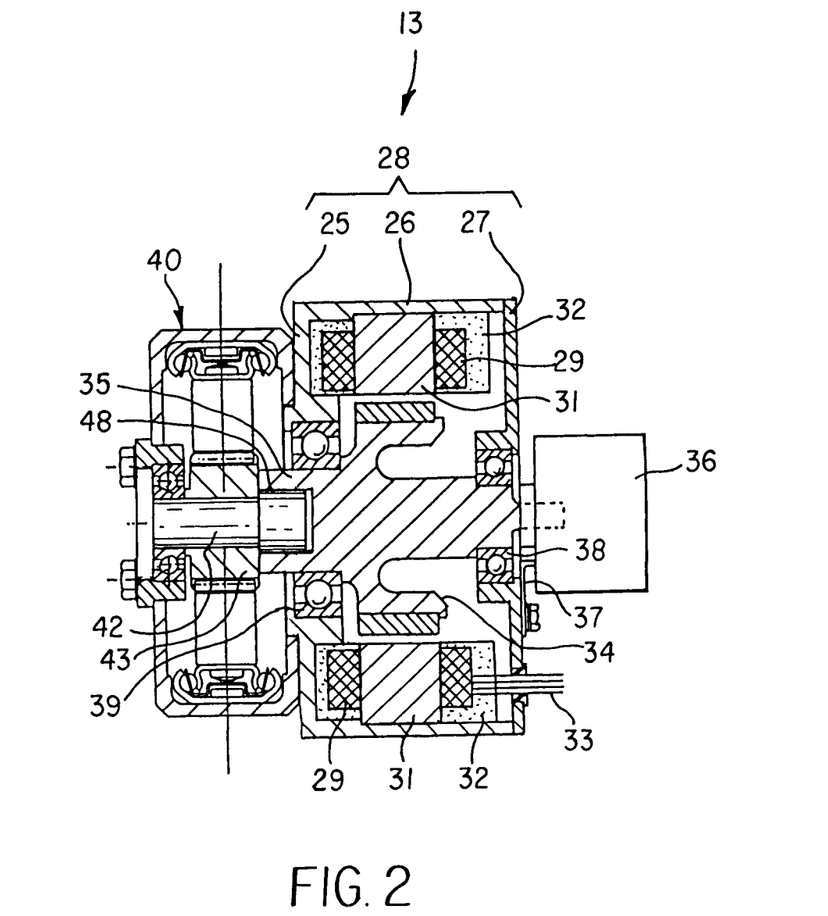
FIG. 2 is a sectional view taken along the line A-A' in FIG. 1, showing a motor and a pinion and rack casing.
Figure 3A:
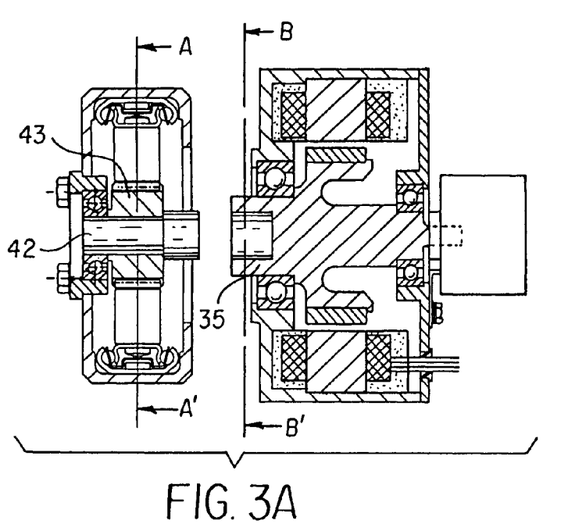
FIG. 3A is a view showing a state where the motor shown in FIG. 2 is detached from the pinion and rack casing.

FIG. 2 is a sectional view taken along the line A-A' in FIG. 1, showing both the motor 13 and the pinion and rack casing 40, while FIG. 3A is a view showing a state where the motor 13 shown in FIG. 2 is detached from the pinion and rack casing 40. As shown in FIGS. 2 and 3, in this embodiment, a flat motor such as a permanent magnet synchronous motor is used as the motor 13. The outer circumferential side of the motor 13 is covered with a housing frame 28 which has a front shielding plate 25 on a drive end side, a motor frame 26 integrated with the front shielding plate 25, and a rear shielding plate 27 for covering a rear opening on an encoder attachment side of the motor frame 26.

A stator iron core 31 is molded of an insulating resin 32 and wound with a stator coil 29 that is disposed on an inner wall of the motor frame 26. A feeder cable 33 provided from the outside is connected to the stator coil 29.

Figure 3B:
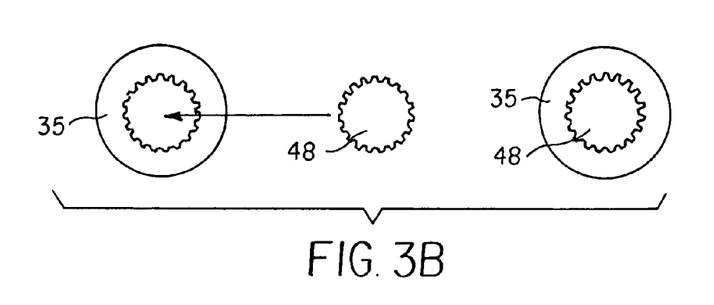
FIG. 3B is a cross-sectional view of the motor shown in FIG. 3A taken along the line B-B.

A rotor 34, shaped like a bottomed cylinder, is disposed opposite to the stator iron core 31 with a predetermined distance kept between the rotor 34 and the stator iron core 31. The rotor 34 as an output shaft of the motor 13 is preferably provided with a sleeve 35 (see FIG. 3A), as a rotation transmission portion, so that the sleeve 35 protrudes slightly forward (left in FIG. 2) from the front shielding plate 25 on the drive end side. FIG. 3B illustrates a cross-section of the sleeve 35 taken along the line B-B shown in FIG. 3A. The inner circumference of the sleeve 35 is provided with female spline arranged at regular intervals.

An encoder 36 is fitted to an end portion of the rotor 34 on a side opposite to the sleeve 35. The encoder 36 is attached to the motor 13 by an encoder attachment plate spring 37. In this embodiment, a photoelectric rotary encoder is used as the encoder 36. That is, a rotary disk (not shown) is provided with slits is fixed onto a shaft end of the rotor 34.

A light-emitting element and a light-receiving element are disposed opposite to each other with respect to the rotary disk. Light emitted from the light-emitting element is blocked by the rotary disk to thereby detect the number of rotations and the direction of rotation of the rotor 34 and detect the rotational speed, etc. in accordance with necessity.

The end portion of the rotor 34 on a side fitted to the encoder 36 and the end portion of the rotor 34 on a side of formation of the sleeve 35 in the motor 13 are born by shaft bearings 38 and 39 respectively. Accordingly, even when the motor 13 is alone because the motor 13 has been already detached from the pinion and rack casing 40 as shown in FIG. 3A, there is no possibility that the rotor 34 will be adsorbed on the stator iron core 31 by attraction force of a permanent magnet stuck on a rotation surface of the rotor 34.

On the other hand, the pinion and rack casing 40 (see FIGS. 1 and 3) to which the motor 13 will be releaseably attached contains a pinion 43 and right and left racks 24 and 17. The pinion 43 is connected and fixed to a rotation shaft 42 born by a shaft bearing so that the pinion 43 can rotate together with the rotation shaft 42. The right and left racks 24 and 17 engage with opposite sides (upper and lower sides) of the pinion 43, respectively.

A right rack slide rail 44 is fixed to the right rack 24. The right rack slide rail 44 is guided by a right guide rail 45 fixed to an upper portion of the inside of the pinion and rack casing 40 so that the right rack slide rail 44 can slide left and right together with the right rack 24.

On the other hand, a left rack slide rail 46 is fixed to the left rack 17. The left rack slide rail 46 is guided by a left guide rail 47 fixed to a lower portion of the inside of the pinion and rack casing 40 so that the left rack slide rail 46 can slide left and right together with the left rack 17.

In this embodiment, the left and right racks 17 and 24 and the left and right guide rails 47 and 45 are held in the rack and pinion casing 40 as described above. Accordingly, the rack and pinion casing 40 is extended slenderly along directions of movement of the left and right racks 17 and 24 as shown in FIG. 1 so that ranges of movement of the left and right racks 17 and 24 can be covered with the rack and pinion casing 40.

Figure 3C:
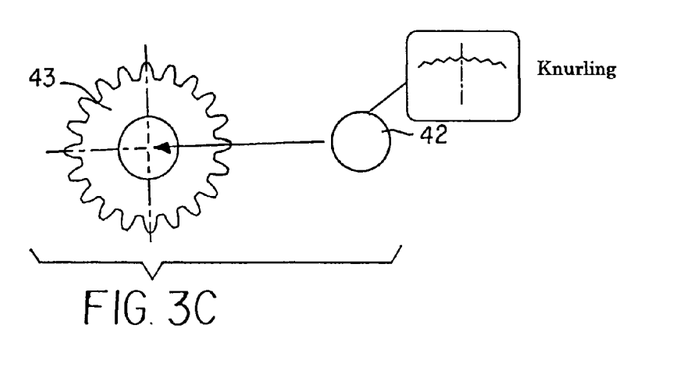
FIG. 3C is a cross-sectional view of the motor shown in FIG. 3A taken along line A-A.

As shown in FIGS. 2 and 3, a spline shaft 48 is preferably integrally formed in an end portion of the rotation shaft 42 of the pinion and rack casing 40 on a side of attachment to the motor 13. Male spline grooves are formed in an outer circumferential surface of the spline shaft 48 as shown in FIG. 3C, which is a cross-sectional view taken along line A-A of FIG. 3A, so that the spline grooves correspond to the convex stripes of the inner circumferential surface of the sleeve 35. FIG. 2 shows a state where the sleeve 35 is fitted on the spline shaft 48 so that the female spline of the sleeve 35 engage with the male spline of the spline shaft 48 to thereby fix the front shielding plate 25 of the motor 13 to the pinion and rack casing 40. The fit between the sleeve 35 and spline shaft 48 is a releaseable fitted, namely, the two component parts can be easily separated from one another when pulled apart. Because the sleeve 35 and the spline shaft 48 are fitted to each other in this manner, the spline shaft 48 fitted to the sleeve 35, that is, the pinion 43 in the pinion and rack casing 40 rotates in the same direction as the rotor 34 of the motor 13 when the rotor 34 rotates, while enabling the sleeve 35 to be releaseably detached from the spline shaft 48 to remove the motor.

The right and left racks 24 and 17 are disposed opposite to each other with respect to the pinion 43 so as to engage with the pinion 43 move in substantially parallel and opposite directions (opposite lateral directions in FIG. 1 or opposite cross directions in FIG. 3A) because the right rack 24 is guided on the right rack slide rail 44 by the right guide rail 45 while the left rack 17 is guided on the left rack slide rail 46 by the left guide rail 47. Similarly, the pair of left and right doors 11 and 12 (shown in FIG. 1) connected to the right and left racks 24 and 17 through the aforementioned connection members respectively so as to be hung down move in opposite lateral directions respectively, so that the pair of left and right doors 11 and 12 are opened or closed.

More specifically, this operation is as follows. A switch not shown is turned on in the closed state of the left and right doors 11 and 12 as shown in FIG. 1 to drive the motor 13 to rotate the rotor 34 in the direction of the arrow a in FIG. 1. Then, the left rack 17 engaged with the pinion 43 shown in FIGS. 2 and 3 moves in the direction of the arrow b in FIG. 1. The left door 11 moves in the same direction (as the direction of the arrow b) through the linker 16 and the hangers 14a and 14b in accordance with the movement of the left rack 17 with the linker 16 being fixed to the left rack 17. In this case, the left slide rail 15 fixed to the linker 16 moves in the same direction (as the direction of the arrow b) while guided by the left door rail 18, so that the left door 11 can move smoothly. At the same time, the right rack 24 engaged with the pinion 43 moves in the direction of the arrow c in accordance with the rotation of the rotor 34 of the motor 13 in the direction of the arrow a in FIG. 1 as described above. When the right rack 24 moves, the right door 12 moves in the same direction (as the direction of the arrow c) through the linker 23 and the hangers 21a and 21b with the linker 23 being fixed to the right rack 24. Also in this case, the right slide rail 22 fixed to the linker 23 moves in the same direction (as the direction of the arrow c) while guided by the right door rail 25A, so that the right door 12 can move smoothly. The number of rotations and the direction of rotation (and the rotational speed if necessary) of the rotor 34 which is the output shaft of the motor 13 are detected by the encoder 36 on this occasion, so that the positions and moving directions of the left and right doors 11 and 12 are detected. Accordingly, the motor 13 can be controlled based on a signal output from the encoder 36.

In the configuration of the door driving apparatus 10 which operates as described above according to this embodiment as shown in FIG. 1, when the motor 13 needs to be repaired or exchanged for a new one, the pinion and rack casing 40 is disengaged from the front shielding plate 25 of the motor 13 shown in FIG. 2 so that the motor 13 is individually removed as shown in FIG. 3A from the door driving apparatus 10 shown in FIG. 1. Because the connection of the rotation shaft 42 of the pinion 43 and the shaft of the rotor 34 as a drive shaft of the motor 13 is based on the releaseable fitted engagement of the sleeve 35 and the spline shaft 48, the motor 13 can be attached/detached freely to/from the pinion 43. Because the connection of the motor 13 and the pinion 43 is only based on the engagement of the sleeve 35 and the spline shaft 48 in this manner, the motor 13 can be individually removed from the pinion and rack casing 40 while the pinion 43 is left in the pinion and rack casing 40 when the motor 13 needs to be removed from the pinion and rack casing 40. Because the pinion 43 is left in the pinion and rack casing 40 in this manner even when the motor 13 is removed from the door driving apparatus 10, there is no possibility that relative position displacement will occur in the right and left racks 24 and 17 disposed opposite to each other with respect to the pinion 43 so as to engage with the pinion 43. Accordingly, it is unnecessary to align the relative positions of the right and left racks 24 and 17 when the repaired motor 13 or a new motor 13 for exchange is attached to the pinion and rack casing 40. Accordingly, there is no labor of inputting alignment information to a controller of the door driving apparatus 10.

The door driving apparatus 10 according to this embodiment can be applied not only to automatic doors in various vehicles such as electric trains or automobiles but also to automatic doors in various buildings such as factory buildings or apartment buildings.

Figure 4:
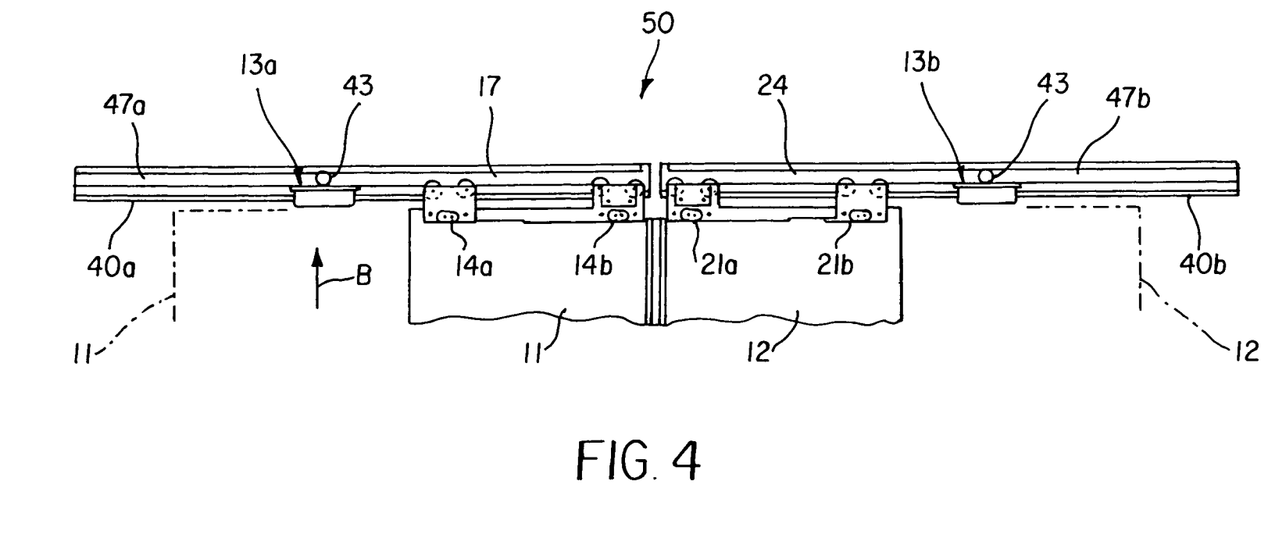
FIG. 4 is an overall front view of a door driving apparatus according to a second embodiment of the invention.
Figure 5:
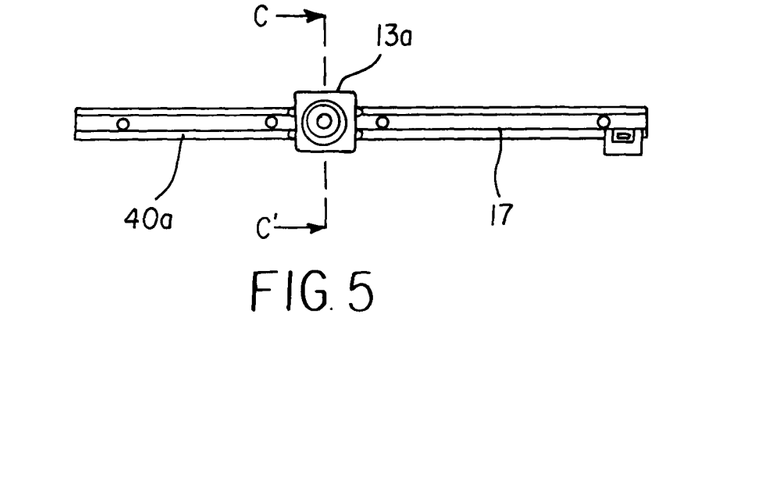
FIG. 5 is a view in the direction of the arrow B in FIG. 4.
Figure 6:
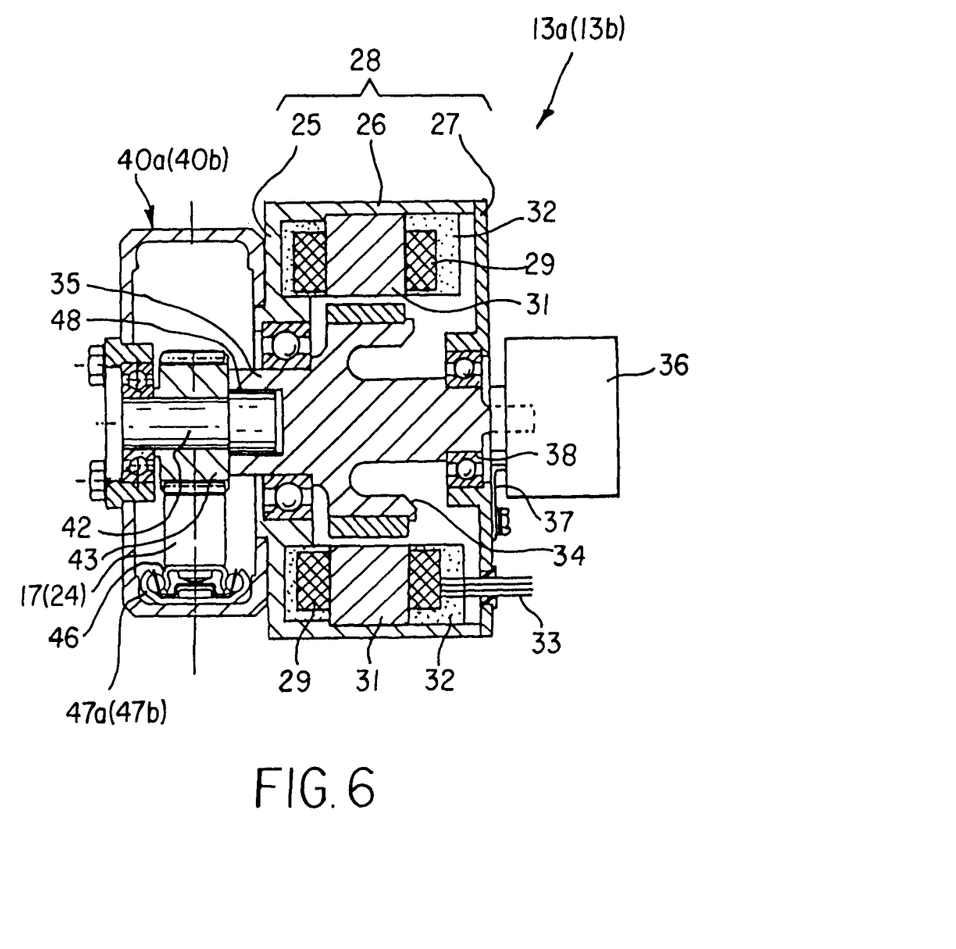
FIG. 6 is a sectional view taken along the line C-C' in FIG. 5.

FIG. 4 is an overall front view of a door driving apparatus according to a second embodiment of the invention, FIG. 5 is a view in the direction of the arrow B in FIG. 4, and FIG. 6 is a sectional view taken along the line C-C' in FIG. 5. Incidentally, in FIGS. 4 to 6, parts identical or similar to those in the configuration shown in FIGS. 1 to 3 are referred to by the same numerals as in FIGS. 1 to 3.

As shown in FIG. 4, the door driving apparatus 50 according to this embodiment is configured so that two motors 13 (13a and 13b) are used for opening/closing the left and right doors 11 and 12. FIG. 6 shows the left motor 13a, the right motor 13b has the same structure as that of the left motor 13a. In FIGS. 4 to 6, rotors 34 which are respective output shafts of the left and right motors 13a and 13b are provided so that pinions 43 are connected to the rotors 34 through sleeves 35, spline shafts 48 and rotation shafts 42 in left and right rack and pinion casings 40a and 40b respectively.

In the left rack and pinion casing 40a, a left rack 17 engages with one of the pinions 43. In the right rack and pinion casing 40b, a right rack 24 engages with the other of the pinions 43. The left rack 17 moves along a left guide rail 47a attached to the left rack and pinion casing 40a. The right rack 24 moves along a right guide rail 47b attached to the right rack and pinion casing 40b.

The left and right racks 17 and 24 and the left and right guide rails 47a and 47b are held in the left and right rack and pinion casings 40a and 40b respectively. The left and right rack and pinion casings 40a and 40b are detachably fixed to front shielding plates 25 of the motors 13 respectively through bolts or the like not shown.

Accordingly, when, for example, the left motor 13a is driven, the left rack 17 engaged with one of the pinions 43 moves so that the left door 11 is driven to be opened or closed through hangers 14a and 14b connected to the left rack 17. In this case, because the left rack 17 moves smoothly along the left guide rail 47a, the left door 11 moves smoothly.

Similarly, when, for example, the right motor 13b is driven, the right rack 24 engaged with the other of the pinions 43 moves so that the right door 12 is driven to be opened or closed through hangers 21a and 21b connected to the right rack 24. Also in this case, because the right rack 24 moves smoothly along the right guide rail 47b, the right door 12 moves smoothly.

According to this embodiment, the provision of two motors 13a and 13b permits the door connection structure to be simplified and the left and right doors 11 and 12 to be controlled to be opened/closed individually. Accordingly, for example, in a state where one of the left and right doors 11 and 12 is closed, the other door can be controlled to be opened/closed if necessary.

As shown in FIG. 6, the left and right rack and pinion casings 40a and 40b are formed so that the left and right racks 17 and 24 engage with only lower portions of the pinions 43 but the racks, the rack slide rails and the rack slide rails are not provided in upper portions of the pinions 43. When the motor 13a (or 13b) needs to be repaired or exchanged for a new one, the front shielding plate 25 of the motor 13a (or 13b) shown in FIG. 6 can be disengaged from the pinion and rack casing 40a (or 40b) so that the motor 13a (or 13b) can be individually removed from the door driving apparatus 50 as shown in FIG. 4. Also, because the connection of the rotation shaft 42 of the pinion 43 and the shaft of the rotor 34 as a drive shaft of the motor 13a (or 13b) shown in FIG. 6 is based on the releaseable fitted engagement of the sleeve 35 and the spline shaft 48, the motor 13a (or 13b) can be attached/detached axially freely to/from the pinion 43. Because the connection of the motor 13a (or 13b) and the pinion 43 is only based on the engagement of the sleeve 35 and the spline shaft 48 as described above, the motor 13a (or 13b) can be singly removed while the pinion 43 can be left in the pinion and rack casing 40a (or 40b) when the motor 13a (or 13b) is removed from the pinion and rack casing 40a (or 40b). Further, because the pinion 43 is left in the pinion and rack casing 40a (or 40b) as described above, even when the motor 13a (or 13b) is removed from the door driving apparatus 50, positional displacement hardly occurs in the left rack 17 (or the right rack 24) engaged with the pinion 43.

When the repaired motor 13a (or 13b) or a new motor 13a (or 13b) for exchange needs to be attached to the pinion and rack casing 40a (or 40b), it is unnecessary to fit the shaft end of the motor into a shaft bearing or the like and it is easy to handle the motor because the motor 13a (or 13b) can be attached to the pinion and rack casing 40a (or 40b) by a simple method of fitting the sleeve 35 on the spline shaft 48 and then fixing the front shielding plate 25 to the pinion and rack casing 40a (or 40b).

The door driving apparatus 50 according to this embodiment can be applied not only to automatic doors in various vehicles such as electric trains or automobiles but also to automatic doors in various buildings such as factory buildings or apartment buildings.

The invention has been described with reference to certain preferred embodiments thereof, it will be understood, however, that modifications and variations are possible within the scope of the appended claims. For example, while the illustrated embodiment shows the sleeve 35 formed on the rotor 34 and the spline shaft 48 formed on the rotations shaft 42, the sleeve 35 may alternatively be formed on the rotation shaft 42 side of the pinion and rack casing 40 while the spline shaft 48 may be formed on the rotor 34 side of the motor 13. In such a case, the spline shaft become the rotation transmission portion and the sleeve becomes the rotation transmitter. Further, while the sleeve 35 is preferably formed as an integral part of the output shaft, it will be understood that the sleeve 35 may also be separate component attached to the output shaft. Similarly, while the spline shaft 48 is preferably integrally formed as part of the rotation shaft 42, the spline shaft 48 may also be a separate element that is attached to the rotation shaft 42. These are only a few examples of possible variations on the illustrated embodiments.

This application is based on, and claims priority to, Japanese Patent Application No: 2008-115220, filed on Apr. 25, 2008. The disclosure of the priority application, in its entirety, including the drawings, claims, and the specification thereof, is incorporated herein by reference.

What is claimed is:

1. A movable body driving apparatus comprising:
   a rotation actuator;
   a housing frame of the rotation actuator;
   an output shaft of the rotation actuator supported by a first bearing member and a second bearing member, the output shaft including a rotor, the first bearing member being disposed adjacent a first end of the output shaft, and the second bearing member being disposed adjacent a second end of the output shaft, the first end being opposite the second end, the first bearing member and the second bearing member are disposed within the housing frame;
   a rotation transmission portion positioned at the first end of, and formed integrally with, the output shaft of the rotation actuator, the rotation transmission portion protruding outside the housing frame;
   a rotation transmitter connected to a rotation shaft, wherein the rotation transmitter and the rotation shaft rotate together; and
   at least one linear transmitter engaged with the rotation transmitter;
   the rotation shaft being supported on a first end by a third bearing member, a second end of the rotation shaft being releaseably fitted to the rotation transmission portion;
   wherein, the first bearing member is disposed adjacent to and in contact with a first side of the housing frame, and the second bearing member is disposed adjacent to and in contact with a second side of the housing frame.

2. A movable body driving apparatus as claimed in claim 1, wherein the at least one linear transmitter includes a pair of linear transmitters disposed opposite to each other with respect to the rotation transmitter and engaged with the rotation transmitter so that the pair of linear transmitters can move in directions substantially parallel and opposite to each other.

3. A movable body driving apparatus as claimed in claim 1, wherein the at least one linear transmitter is engaged with the rotation transmitter so that the at least one linear transmitter can move in both forward and backward directions substantially parallel to each other.

4. A movable body driving apparatus according to claim 1, further comprising guide members which guide the at least one linear transmitter.

5. A movable body driving apparatus according to claim 4, further comprising holding casings which hold the at least one linear transmitter and the guide members, wherein the holding casings are fixed to the housing frame so that the holding casings can be attached/detached to/from the housing frame.

6. A movable body driving apparatus according to claim 1, wherein the rotation actuator has at least one sensor which can detect the number of rotations and the direction of rotation of the output shaft.

7. A movable body driving apparatus according to claim 1, wherein the rotation transmission portion comprises a sleeve located at the first end of the output shaft.

8. A movable body driving apparatus according claim 1, wherein the rotation transmitter includes a spline shaft located at the second end of the rotation shaft.

9. A movable body driving apparatus according to claim 8, wherein the spline shaft is formed integral with the rotation shaft.

* * * * *